(12) United States Patent
Sethi et al.

(10) Patent No.: US 11,669,548 B2
(45) Date of Patent: Jun. 6, 2023

(54) PARTIAL TABLE AND MULTISOURCE SYNCHRONIZATION FOR DATABASES

(71) Applicant: Formagrid Inc., San Francisco, CA (US)

(72) Inventors: Raghav Sethi, San Francisco, CA (US); Ryan Joshua Pearl, San Francisco, CA (US); Jonathan Chien, San Francisco, CA (US); Chuan Ji, San Francisco, CA (US); Nenya Edjah, San Francisco, CA (US); Emmett Nicholas, San Francisco, CA (US); Jonathan Brandon Bakst, Rolling Hills, CA (US)

(73) Assignee: Formagrid Inc, San Francisco, CA (US)

( * ) Notice: Subject to any disclaimer, the term of this patent is extended or adjusted under 35 U.S.C. 154(b) by 0 days.

(21) Appl. No.: 17/473,872

(22) Filed: Sep. 13, 2021

(65) Prior Publication Data
US 2022/0083565 A1 Mar. 17, 2022

Related U.S. Application Data

(60) Provisional application No. 63/078,295, filed on Sep. 14, 2020, provisional application No. 63/165,538, filed on Mar. 24, 2021.

(51) Int. Cl.
*G06F 16/00* (2019.01)
*G06F 16/27* (2019.01)
(Continued)

(52) U.S. Cl.
CPC .......... *G06F 16/273* (2019.01); *G06F 16/211* (2019.01); *G06F 16/215* (2019.01); *G06F 16/258* (2019.01)

(58) Field of Classification Search
None
See application file for complete search history.

(56) References Cited

U.S. PATENT DOCUMENTS

| 10,430,437 B2 | 10/2019 | Purushothaman et al. |
| 2007/0083521 A1* | 4/2007 | Diedrich ................. H04L 67/63 |

(Continued)

FOREIGN PATENT DOCUMENTS

KR  10-2018-0120499 A  11/2018

OTHER PUBLICATIONS

PCT International Search Report and Written Opinion, PCT Application No. PCT/IB2021/058325, dated Dec. 3, 2021, 10 pages.
(Continued)

*Primary Examiner* — Bai D Vu
(74) *Attorney, Agent, or Firm* — Fenwick & West LLP

(57) ABSTRACT

A database system provides automatic synchronization from one or more databases to a table. The synchronized portion of each source database table is periodically imported into a corresponding portion of a destination database table. For each synchronized field in the table with data from multiple source databases, one of the source databases is set as a primary source, which determines the data type and field configuration of the field. Data from secondary sources are cast to the data type established by the primary source and represented using the primary source's field configuration. The source database table may also include data that is not synchronized with the destination database table. Similarly, the destination database table may be enriched with data that is not included in the source database table.

16 Claims, 7 Drawing Sheets

(51) Int. Cl.
  *G06F 16/25* (2019.01)
  *G06F 16/21* (2019.01)
  *G06F 16/215* (2019.01)

(56) References Cited

U.S. PATENT DOCUMENTS

| | | | |
|---|---|---|---|
| 2010/0228768 A1* | 9/2010 | Yamasuge | G06F 16/273 |
| | | | 709/219 |
| 2010/0274759 A1 | 10/2010 | Takeuchi et al. | |
| 2011/0004668 A1 | 1/2011 | Salmon et al. | |
| 2012/0008971 A1 | 4/2012 | Rakowski et al. | |
| 2013/0166507 A1* | 6/2013 | Staczek | H04L 67/1095 |
| | | | 707/625 |
| 2016/0210202 A1 | 7/2016 | Sinha | |
| 2016/0277494 A1* | 9/2016 | Ito | H04L 69/28 |
| 2020/0409977 A1* | 12/2020 | Yang | G06F 8/61 |
| 2022/0012265 A1 | 1/2022 | Salame | |

OTHER PUBLICATIONS

United States Office Action, U.S. Appl. No. 17/692,943, dated May 11, 2022, 10 pages.

* cited by examiner

PARTIAL TABLE AND MULTISOURCE SYNCHRONIZATION FOR DATABASES

CROSS-REFERENCE TO RELATED APPLICATIONS

This application claims the benefit of U.S. Provisional Application No. 63/078,295, filed Sep. 14, 2020, and U.S. Provisional Application No. 63/165,538, filed Mar. 24, 2021, each of which is incorporated by reference.

BACKGROUND

1. Technical Field

The subject matter described relates generally to databases and, in particular, to techniques for synchronizing data from one or more sources to a data table.

2. Background Information

Enterprises and other entities often provide different users with access permission to different subsets of the data available to the entity. As a result, entities typically maintain multiple databases that include partially overlapping data. Maintaining consistency between the overlapping portions can be a time-consuming and error prone task. For example, if a human is responsible for entering new data into multiple databases, typographical and other errors may lead to discrepancies between different versions of the data. One approach to addressing this problem is to store the data in a single database and control which users have access to which records but maintaining the access permissions in this scenario is also a time-consuming process. This process is also subject to error. For example, human error in updating permissions may reveal confidential data to users who are not authorized to access it.

Maintaining a database that includes data from several sources can be especially time-consuming and error prone. When an attribute in the database includes data taken from multiple sources, data loss can occur when different sources have different data types or different labels for the attribute.

SUMMARY

The above and other problems may be addressed by a database system that provides automatic synchronization from one or more databases to a table. The synchronized portion of each source database table may be periodically (e.g., once every five minutes, once an hour, etc.) imported into a corresponding portion of a destination database table. For each synchronized field in the table with data from multiple source databases, one of the source databases is set as a primary source, which determines the data type and field configuration of the field. Data from secondary sources are cast to the data type established by the primary source and represented using the primary source's field configuration.

The source database table may also include data that is not synchronized with the destination database table. Similarly, the destination database table may be enriched with data that is not included in the source database table.

DETAILED DESCRIPTION

The figures and the following description describe certain embodiments by way of illustration only. One skilled in the art will readily recognize from the following description that alternative embodiments of the structures and methods may be employed without departing from the principles described. Wherever practicable, similar or like reference numbers are used in the figures to indicate similar or like functionality. Where elements share a common numeral followed by a different letter, this indicates the elements are similar or identical. A reference to the numeral alone generally refers to any one or any combination of such elements, unless the context indicates otherwise.

The techniques described herein provide for data synchronization among various data tables, whether local or external, such that the data in a synchronized data table is consistent and up to date. Synchronized data tables can be used to allow various groups of users to manage and evolve their databases and workflows independently, while still being able to collaborate on shared data tables where data from various sources is aggregated. Furthermore, this may provide data synchronization with fewer transcription errors than existing approaches.

The described techniques also provide for increased data security. For example, synchronized tables provide for limited data visibility, where access can be limited to particular users or groups. Synchronized tables enable a user to share, on a limited basis, particular subsets of data from the user's database with other users, internal or external, and the user can set, on a user-by-user or per-domain basis, read and write permissions to the shared data in the synchronized table. As these permissions are set for the synchronized table, any edits to the synchronized table do not affect the user's source table, preserving the integrity of the user's database. A synchronized data table can be used to expose particular up-to-date data to external users, e.g., from different organizations, with tight control over the schedule on which the data updates, and the ability to revoke data sharing, thus balancing collaboration and security in inter-organizational sharing.

These and other benefits can be recognized in view of the present disclosure.

Example Systems

Figure 1:
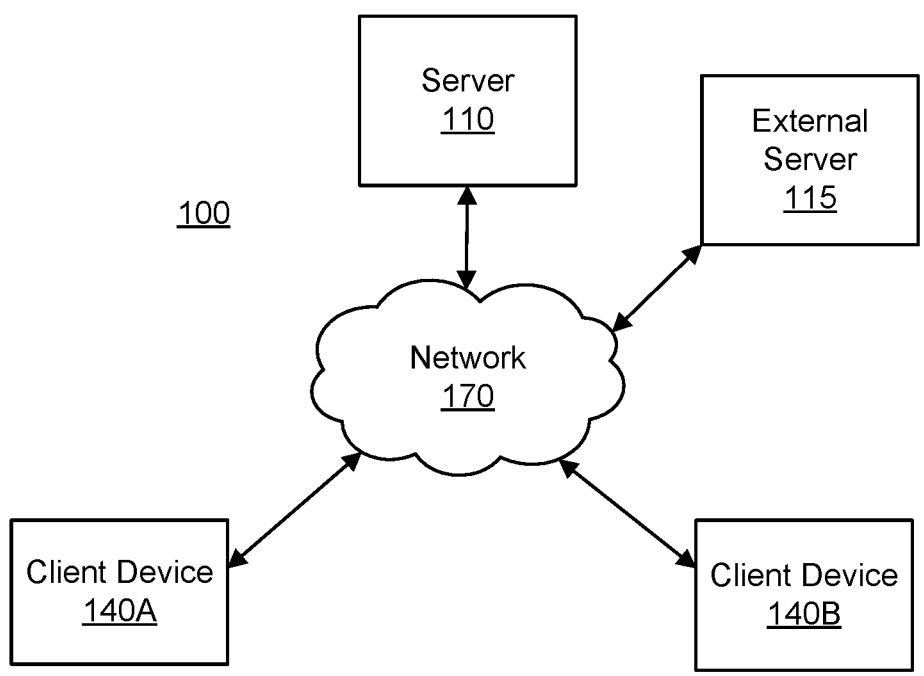
FIG. 1 is a block diagram of a networked computing environment suitable for providing partially synchronized database tables, according to one embodiment.

FIG. 1 illustrates one embodiment of a networked computing environment 100 suitable for providing partially synchronized database tables. In the embodiment shown, the networked computing environment 100 includes a server 110, an external server 115, a first client device 140A, and a second client device 140B, all connected via a network 170. Although two client devices 140 are shown, the networked computing environment 100 can include any number of client devices 140. Similarly, although one external server 115 is shown, the networked computing environment 100 can include any number of external servers 115. In other embodiments, the networked computing environment 100 includes different or additional elements. In addition, the functions described herein may be distributed among the elements in a different manner than described.

The server 110 hosts multiple databases and performs synchronization between databases with a cross-base synchronize function. The cross-base synchronize function copies data from a shared source view to a target table. Data may be copied in one direction during a synchronization. When a synchronization completes, the target table contains all of the rows in the source view and cell data for all columns (alternatively, "fields") selected to be synchronized. In one embodiment, only data (rows and columns) that are explicitly or implicitly set as 'visible' in the shared view can be copied. Users may determine what data is available to synchronize (and in what form) using a shared view interface (e.g., to designate one or more rows or columns as visible or not visible). As described in further detail below, a user can synchronize some or all data from one or more sources to a target table, and one or more of the sources can be external to the server 110, e.g., may be hosted by an external server 115.

In an embodiment, data in the target table matches the format of the data in the shared view interface. For example, if linked records are rendered as text in shared views, they also render as text in the target table. Formulas may render as their result type and look like a non-formula field. As a consequence of this design, synchronization does not differentiate between data being deleted from the source table or simply being hidden from the shared view. As described in further detail below, matching data from source to target table can follow an alternative technique.

The following table illustrates the mapping between source and target data types for one embodiment:

| Source type | Target type |
| --- | --- |
| Number/date/single-line text/long text/rich text/select/multi-select | Identical type and configuration (e.g. number/date formatting, select color and order) |
| Foreign key | Text |
| Collaborator/Multi-collaborator | Text |
| Lookups | As the looked-up type (so synchronizing a lookup of a foreign key will result in text) |
| Formulas/Rollups | As the result type |
| Button fields | 'Open URL' type button fields will be synchronized as URL field |
| Attachments | As-is |

A synchronized target table mirrors the contents of its source view but can contain additional unsynchronized columns to enrich the synchronized data. For example, one might collect T-shirt sizes for all employees by synchronizing into the target table a list of employees and then adding an unsynchronized 'T-shirt size' column, where each employee enriches the target table by entering their T-shirt size to a respective row at the 'T-shirt size' column.

In an embodiment, users of the target table are not allowed to create or destroy records in the synchronized portion of the table, nor to change cell values or column type and type options for any synchronized column, but they can make changes to non-synchronized columns. In some embodiments, users of the target table may change the names and descriptions for synchronized columns, which does not impact the source table (i.e., source view) but changes how the synchronized data is displayed in the target table (e.g., a column in the target table has a different name than the corresponding column in the source table).

Various embodiments of the server 110 are described in greater detail below, with reference to FIG. 2.

The client devices 140 are computing devices with which users can access and edit the databases managed by the server 110. Example client devices include desktop computers, laptop computers, smartphones, tablets, etc. The client devices 140 may enable users to interact with the databases via a user interface accessed via a browser, a dedicated software application executing on the client devices, or any other suitable software.

The external server 115 is a server, which may be associated with a different entity than the server 110. For example, server 110 is associated with a first organization, and server 115 is associated with a second organization. The external server 115 may be, for example, a SALESFORCE server, a JIRA server, a GOOGLE CALENDAR server, or a BOX server. Users of client devices 140 can synchronize data from source tables in databases hosted at the external server 115 to target tables at the server 110. This can involve the user providing credential information, which the server 110 uses to connect to the external server 115.

The server 110 can synchronize data from the external server 115 to a target table in a database of the server 110. In one embodiment, the server 110 stores a tabular data mapping to translate data from the external server 115 to a usable format for server 110 databases. The server 110 may store a different tabular data mapping for each of multiple external servers 115 to facilitate data transfer to the target table. For example, the server 110 may store a first tabular data mapping for SALESFORCE reports that uses a SALESFORCE application programming interface (API), a second tabular data mapping for JIRA issue filters that uses a JIRA API, and a third tabular data mapping for GOOGLE CALENDAR events that uses a GOOGLE CALENDAR API. Using the API of an external server 115, the server 110 can request and receive synchronized data for a target table. For example, the server 110 may send a query to the external server 115 using a respective API function, where the query specifies the data to be synchronized to the target table, and then the server 110 receives, via a different API function, query results including the synchronized data from the external server 115. The server 110 identifies an external server 115, fetches the respective tabular datamapping, and uses the respective tabular data mapping to synchronize data from the external server 115 (e.g., to a target table).

The network 170 provides the communication channels via which the other elements of the networked computing environment 100 communicate. The network 170 can include any combination of local area and wide area networks, using wired or wireless communication systems. In one embodiment, the network 170 uses standard communications technologies and protocols. For example, the network 170 can include communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 170 include multiprotocol label switching (MPLS), transmission control protocol/Internet protocol (TCP/IP), hypertext transport protocol (HTTP), simple mail transfer protocol (SMTP), and file transfer protocol (FTP).

Data exchanged over the network 170 may be represented using any suitable format, such as hypertext markup language (HTML) or extensible markup language (XML). In some embodiments, all or some of the communication links of the network 170 may be encrypted using any suitable technique or techniques.

Embodiments of various techniques of the networked computing environment 100 will now be described. Alternative techniques may be employed without departing from the principles set forth herein.

A user of client device 140A can interface with the server 110 to create a synchronized target table according to one or more techniques, depending upon the embodiment. The user interface may be exposed by the server 110 or client device 140A. In one embodiment, the user receives a link to a shared view (e.g., from an administrator of the database including the shared view). The user provides an instruction the server 110 to use the link to initiate a synchronization, either with a new table or an existing table. The server 110 sets up the requested synchronization between the shared view and the selected table. In one embodiment, the user selects a widget of a user interface exposed by the server 110 that displays a shared view to create a new synchronized table using the shared view.

In an embodiment, the link to the shared view may be temporary, e.g., only useable once, or for a finite period of time, such as 24 hours. Thereafter, the source table may be identified by a source table identifier. In this manner, the source table can be secured, such that if the user ends synchronization to the target table, the link cannot be used to inappropriately gain access the source table. In an embodiment, a user that shares a like to a shared view to another user may revoke access to the shared view from the other user.

In one embodiment, the user has access permission to the source table and the target table. The user can create a new shared view or enable synchronization of an already-existing shared view. The user can then proceed with one of the above techniques. Alternatively, the user can navigate to a user interface that displays the target table and select a widget to expose a list of potential source tables. The user can select the shared view to use it as a source table. In various embodiments, the user can set a table (e.g., for which the user has access permission) as able to be synchronized (i.e., can be used as a source table) or not. In various embodiments, the user can designate some or all of the rows or columns in the table as able to be synchronized or not.

In an embodiment, the user can restrict access to the table such that it is password protected. Additionally or alternatively, the user can restrict access to the table such that only users associated with specified email addresses or email domains can access the table.

In one embodiment, if a source table is password-protected, the user initiating synchronization to a target table is prompted to correctly enter the password to the source table in order to set up the synchronization. Once the password has been entered, synchronization may operate automatically, indefinitely, or for a predetermined time period (e.g., one month or one year) without requiring password reentry. If the password changes, or if a password is added to a previously unprotected source table, the synchronization stops working until authenticated or reauthenticated. In an embodiment, the user can revoke access temporarily or permanently.

In one embodiment, if a source table is email domain-protected, the user initiating the synchronization needs to have a verified email with a permissioned domain in order to set up the synchronization. If the initiating user's email address with the permissioned domain is deactivated, suspended, or otherwise made inactive, the synchronization may cease to operate. Alternatively, a synchronization may remain operational as long as any user of the target table has an email address with a permissioned domain.

In an embodiment, the user can add one or more external source tables to a synchronized table by selecting an external source widget in the user interface. The user can then pick another source type (e.g. AIRTABLE, SALESFORCE, or JIRA), select the source table within that type, and then map the fields from the new source table to the fields in the existing table. For each column in the target table, the user interface displays a list of columns in the source table, from which the user can select one column in the source table to associate with the column in the target table (e.g., such that data from the column in the source table is synchronized to the respective column in the target table).

In some embodiments, when adding a new source, the server 110 tries to match column names to existing column names, as described in further detail below. For columns that cannot be matched, the default option may be to synchronize that data to a new column in the target table instead. The user can change any mappings or opt to synchronize any source column to a new synchronized column.

In an embodiment, an option to select all columns is not available when there are multiple synchronization sources. When the user adds a new source table, if an existing source table is configured to synchronize all columns, that source table is changed to synchronize specific columns only. The user can use the user interface to alter the field mapping by selecting a widget to change mappings. In an embodiment, synchronized target tables that do not synchronize from multiple source tables do not include a field mapping. Rather, the target table uses the fields of the source synchronization table.

In an embodiment, after a synchronization is initiated for a target table from a source table, for every source table field, the user can select a new target table field in a dropdown of the user interface to change the target table field associated with the source table field.

Alternatively or additionally, the user can uncheck a field in the user interface to stop synchronizing data from this source table to the mapped target table field, where, if this source table was the primary source, the synchronized target table column will be destroyed.

Alternatively or additionally, the user can synchronize to a new target table field, where if the source table field was previously mapped to a target table field and the source table was the primary source, the synchronized field may be destroyed, and the data mapped to a new field instead. If the source table was not the primary source, the data may be mapped to a new field. If the source table field was previously unmapped, the data in the source table field may be mapped to a new target table field.

In an embodiment, the user can reconfigure, using the user interface, a selection of one or more columns to synchronize to a target table from a source table. Alternatively or additionally, the user can reconfigure a synchronization frequency with which the target table synchronizes to the source table.

Alternatively or additionally, the user can reconfigure whether deleted or hidden rows in the source table are deleted in the target table, where if the user does not choose to delete rows, rows will remain in the target table even after they are deleted in the source table (these rows can be removed by the user).

Alternatively or additionally, the user can remove a source table, which removes all rows associated with the source table. Alternatively or additionally, the user can turn off synchronization functionality for the target table, which converts the target table into a normal (e.g., unsynchronized) data table.

Alternatively or additionally, the user can undo a reconfiguration, which restores the previous set of selected fields, the old synchronize frequency, the old row deletion setting, and so on; however, the availability of the fields and the cell values in the fields remains up to date, since the values come from the source table, and as such they are not reverted to their data from before the reconfiguration.

Alternatively or additionally, the user can trigger a manual synchronization by clicking a widget of the user interface to initiate a synchronization. The user can do this even when the table is configured to synchronize automatically. This allows the user to synchronize the target table without having to wait for the next scheduled synchronization.

In an embodiment, removing all synchronizations to source tables from a target table causes the target table to convert into a normal table that is not synchronized. No data is removed from the target table, but no future changes to source tables are synchronized to the target table. Depending upon the embodiment, this action may not be able to be undone.

In one embodiment, a user can add a button field to the target table and set label text and a color of their choice, where the button links to the source table. When another user clicks this button, the source table opens to the corresponding record in the source table in a new tab of the user interface (if the other user has access permission). For another user that has access to both the source table and target table, the other user can view unsynchronized fields of that source table or make changes to the source table. If the user has configured the target table to not delete rows that are hidden or deleted in the source table, the button may be unable to be selected or visually distinguished when the source record is hidden or deleted. Depending upon the embodiment, formulas or view filters may consume the output of the button field, e.g., the output of the button field can be a link of the source table's record, or null if the source table's record is no longer available.

In one embodiment, if a target table is duplicated, the duplicate table has the same configuration as the original target table. If the user deletes a target table, then restores it, the target table may regain its original configuration from before its deletion.

In an embodiment, the user can change one or more column names or descriptions of the synchronized portion of the target table. This can be used to rename columns to be more appropriate for the target table, for example. In an embodiment, when a user hovers over a column icon in the user interface, they can see the name of the respective source table column (if the target column has a different name). Depending upon the embodiment, the user may or may not be able to add a row, destroy a row, reconfigure a synchronized column, or edit a cell in a synchronized column.

The following table illustrates a correspondence of actions taken upon a source table and responsive changes in a target table subsequent to a synchronization, according to one embodiment:

| Source table action | Target table behavior on next synchronization |
|---|---|
| Destroy/hide column | Destroy column |
| Undestroy/unhide column | Undestroy column if possible/else create a new column. |
| Add column | If 'synchronize all fields' is enabled, add column |
| Add row | Row will be added to the target table |
| Destroy/hide row | If 'synchronize deletions' is enabled: destroy row Otherwise: the "open source record" button gets disabled |
| Change cell values | Change cell values (based on type conversion) |
| Change filters | The set of visible rows will be synchronized |
| Reorder rows | No impact |
| Change column configuration to unsupported type/configuration | Destroy column |
| Change column configuration to supported type/configuration | Change column config (based on type conversion) |
| Disable synchronizing | Synchronizing stops working |
| Re-enable synchronizing | Synchronizing resumes |
| Delete view | Synchronizing stops working |
| Undestroy view | Synchronizing resumes |
| Change share URL | Synchronizing stops, requires re-authentication |
| Add/change shared view password | Synchronizing stops, requires re-authentication |
| Add domain restriction that the user does not satisfy | Synchronizing stops, requires re-authentication by a user in the target table with the appropriate domain |

In an embodiment, synchronization may be two-directional between two tables, where each table acts as a source table and a target table, and synchronized data added to either table is propagated to the other upon a subsequent synchronization.

In an embodiment, a user can generate a view-only link to send to another user, which the other user can use to view the target table only (i.e., the other user cannot edit the target table). Alternatively or additionally, the user can set a user (e.g., by identifier or email address) or a domain as view-only, where the respective one or more users can view but not edit the target table.

In an embodiment, if a field mapping from one source table column to one target table column is removed (e.g., by the user), then added back, the server 110 attempts to restore the same column (thus restoring any lookups that reference that column, or calendars that use it as the date field, etc.). If the server 110 cannot restore the original column, a new column is created instead.

In an embodiment, if a field of a source table was previously synchronized but has since been made unable to be synchronized (e.g., by an administrator of the source table), the user interface may display the source table column as visually distinct (e.g., faded out or an alternative color) than other source table columns. The user can toggle whether to synchronize currently unavailable fields, though they do not appear when the user toggles them on. Only fields that are currently available from the source table, along with any currently selected but unavailable fields, appear in the field list.

Figure 2:
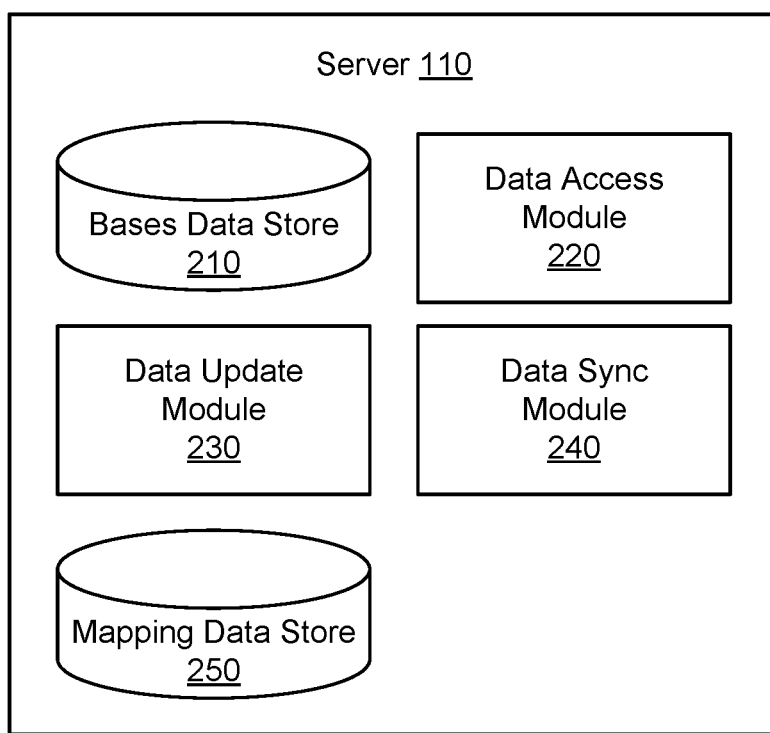
FIG. 2 is a block diagram of the server of FIG. 1, according to one embodiment.

FIG. 2 illustrates one embodiment of the server 110. In the embodiment shown, the server 110 includes a bases data store 210, a data access module 220, a data update module 230, a data synchronize module 240, and a mapping data store 250. In other embodiments, the server 110 includes different or additional elements. In addition, the functions may be distributed among the elements in a different manner than described.

The bases data store 210 includes one or more computer-readable media that store the one or more databases managed by the server 110. Although the bases data store 210 is shown as a single element within the server 110 for convenience, the bases data store 210 may be distributed across multiple computing devices (e.g., as a distributed database). Similarly, individual databases may be hosted by client devices 140 (or other computing devices) with the server 110 managing synchronization between databases but not storing the databases themselves.

The data access module 220 provides a mechanism for users to access data in one or more databases. In one embodiment, the data access module 220 receives a request from a client device 140 indicating an identifier of the requesting user (e.g., a username or user identifier) and data from a specified table in a specified database that the user wishes to view. The data access module 220 determines whether the user has permission to access the requested data and, if so, provides it to the client device 140 from which the request was received for display to the user.

The data update module 230 provides a mechanism for creators and their collaborators to edit data in and add data to databases. In one embodiment, the data update module 230 receives a request from a client device 140 indicating an identifier of the requesting user and data to be added to or amended into a specified table in a specified database. The data update module 230 determines whether the requesting user has permission to edit the specified table and, if so, updates the specified table in the bases data store 210 as requested.

The data synchronize module 240 updates some or all portions of target tables to synchronize them with the corresponding source table (or tables). In one embodiment, the data synchronize module 240 periodically (e.g., for a length of time ranging from one second to one hour, such as every five minutes, every hour, etc.) checks the one or more source tables and, if there is updated data available, imports it into the corresponding one or more target tables (e.g., updates records in the target table with respective records from the source table). Additionally or alternatively, users of a target table may force a manual synchronization to one or more source tables (e.g., by selecting a control in the user interface).

The mapping data store 250 includes one or more computer-readable media that store tabular data mappings for one or more external servers 115. Although the mapping data store 250 is shown as a single element within the server 110 for convenience, the mapping data store 250 may be distributed across multiple computing devices (e.g., as a distributed database).

A user with suitable permissions to a pair of databases may select a subset of the data in a table in one database (e.g., a source table) to synchronize with a corresponding table in a second database (e.g., a target table). Thus, the two tables are referred to as partially synchronized, as only a subset of the rows or columns from the source table are used to populate the target table. However, it should be noted that complete synchronization is also possible, meaning all of the source table is synchronized with the destination table, and the destination table has not been enriched with any additional data (though it may be, depending upon the embodiment). As described below, a user can synchronize some or all data from multiple source databases to one table at one database.

Figure 3:
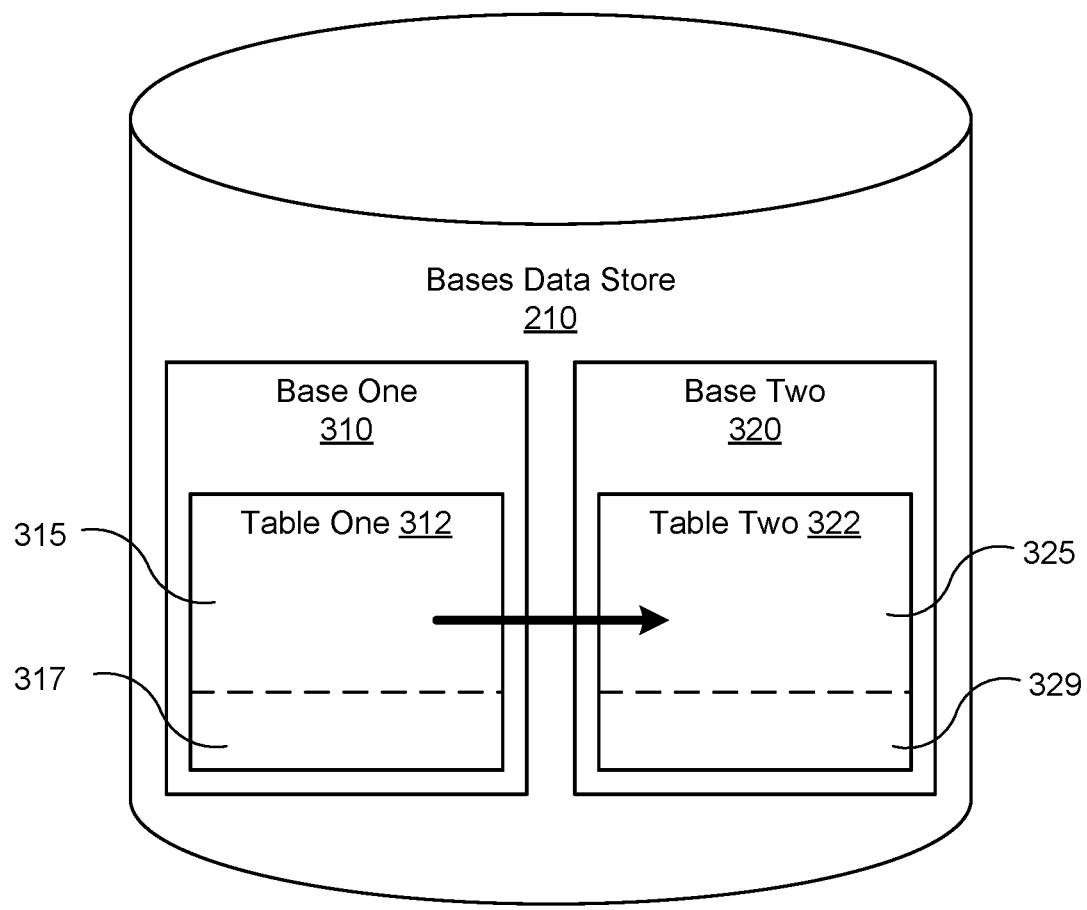
FIG. 3 is a block diagram of the bases data store of FIG. 2, according to one embodiment.

FIG. 3 illustrates the partial synchronization of two tables of two databases in the bases data store 210, according to one embodiment. In the embodiment shown, the bases data store 210 includes base one 310 and base two 320. In practice, the bases data store 210 will likely include many more (e.g., hundreds, thousands, or even millions of) bases. Base one 310 includes table one 312, which has a synchronized portion 315 and an unsynchronized portion 317. Base two 320 includes table two 322, which includes a synchronized portion 325 (which mirrors the synchronized portion 315 of table one 312 except for any differences that arose since the previous synchronization operation) and an enriched portion 329. The enriched portion 329 may include data added by users of base two 320, data synchronized from a third table, or both.

The third table in such a case may either be another table in base one 310 or from a third base (not shown). It should be noted that table two 322 is not limited to receiving synchronized data from just two tables. In theory, table two 322 may receive synchronized data from an unlimited number of other tables, limited only by computational and memory requirements. Similarly, synchronization is not limited to a single generation. Table two 322 may serve as a source table for a third destination table, which may in turn serve as a source table for another target table, etc. Furthermore, each synchronization relationship between a source table and a target table may share a different subset of data selected from either the synchronized portion 325, the enriched portion 329, or both.

Figure 4:
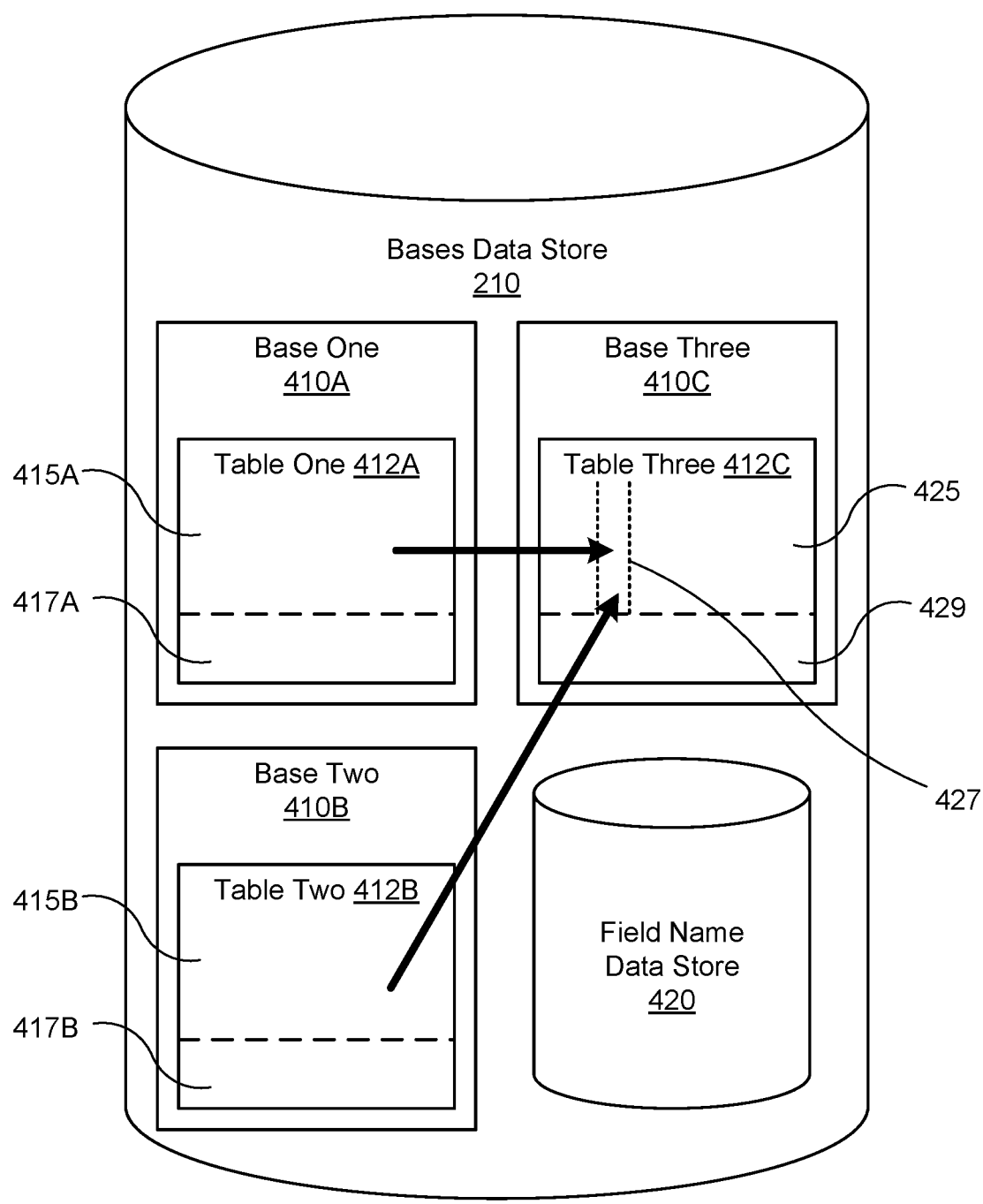
FIG. 4 illustrates multisource synchronization of three tables of three databases in the bases data store 210, according to one embodiment.

FIG. 4 illustrates multisource synchronization of three tables of three databases in the bases data store 210, according to one embodiment. In the embodiment shown, the bases data store 210 includes base one 410A, base two 410B, base three 410C, and a field name data store 420. Base one 410A includes table one 412A, which has a synchronized portion 415A and an unsynchronized portion 417A. Base two 410B likewise includes table two 412B, which has a synchronized portion 415B and an unsynchronized portion 417B. The field name data store 420 stores mappings between potential field names that have a high likelihood of being synonymous (e.g., "first name" and "given name"). The bases data store 210 may include additional bases or tables, depending upon the embodiment.

Base three 410C includes table three 412C, which includes a synchronized portion 425 and an enriched portion 429. The enriched portion 429 may include data added by users of base two 410B, data synchronized from a fourth table, or both. For example, the server 110 may receive user input data (e.g., data that a user input to a client device 140 and sent to the server 110) specifying additional one or more rows or columns to add to table three 410C.

In this embodiment, table three 412C includes a column 427 that synchronizes data from two sources, table one 412A and table two 412B. For example, column 427 includes ten records total, six received from table one 412A and four from table two 412B. A user administrating table three 412C (e.g., using a client device 140) sets table one 412A as the primary source. Depending upon the embodiment, the primary source may be automatically set by the server 110, e.g., based on which source is first synchronized to the column 427, or which source provides the most records to the column 427; the automatically set primary source may be updated by the user, in some embodiments. Source tables other than the primary source may be considered secondary sources.

The server 110 uses the primary source to determine the data type of the column 427. Data from other sources, e.g., table two 412B, is cast to the data type of the data from the primary source in the column. This resolves ambiguities which may arise from synchronizing columns of multiple source tables with different data types to one column in a target table.

For example, the column synchronized from table one 412A to the column 427 may have a data type "text," where the column synchronized from table two 412B to the column 427 may have a data type "date." Because table one 412A is the primary source, the server 110 sets column 427 as having data type "text" and casts data from table two 412B for column 427 as "text."

The server 110 may also determine the field configuration for the column 427 based on the respective field configuration of the column at the primary source from which data is synchronized. In one embodiment, the primary source determines whether the column in the target table is removed when the source table's column is hidden or destroyed. For example, if a column of a primary source is removed from the source table, the server 110 removes the respective column from the target table, but if the corresponding column is removed from a different source table, only records in the target table corresponding to the different source table are affected (e.g., removed). For a target table with a single source table, the single source table can be considered to be the primary source for all fields.

The user also performs field mapping for synchronized fields from table one 412A and table two 412B to table three 412C. In the field mapping, the user sets a correspondence between a column at each source to a column at table three 412C. The server 110 initially attempts to match fields from sources to table three 412C according to field name, which the user can override via a user interface. The server 110 compares field names from synchronized columns of a source (e.g., table one 412A) to field names of synchronized columns in the target table (e.g., table three 412C) and, upon identifying a matching pair, maps the source field to the target field.

For example, table one 412A may include a "first name" field and a "last name" field, table two 412B may include a "given name" field, a "middle name" field, and a "surname" field, and table three 412C may include a "first name" field and a "family name" field. The server 110 matches the "first name" field from table one 412A to the "first name" field from table three 412C, indicating that data from the "first name" field of table one 412A will synchronize to the "first name" field of table three 412C. The user maps the "given name" field of table two 412B to the "first name" field of table three 412C, and the "last name" field of table one 412A and the "surname" field of table two 412B to the "family name" field of table three 412C. As such, data from table one 412A and table 412B will synchronize to the mapped fields in table three 412C.

In an embodiment, the server 110 auto-matches columns with synonymous field names, as determined according to the field name data store 420. The field name data includes mappings between field names that are likely to be synonymous. Thus, the server 110 can use the field name data to identify columns with different but synonymous names as likely matches. The matches can be automatically applied or presented to the user as suggestions for verification.

Example Methods

Figure 5:
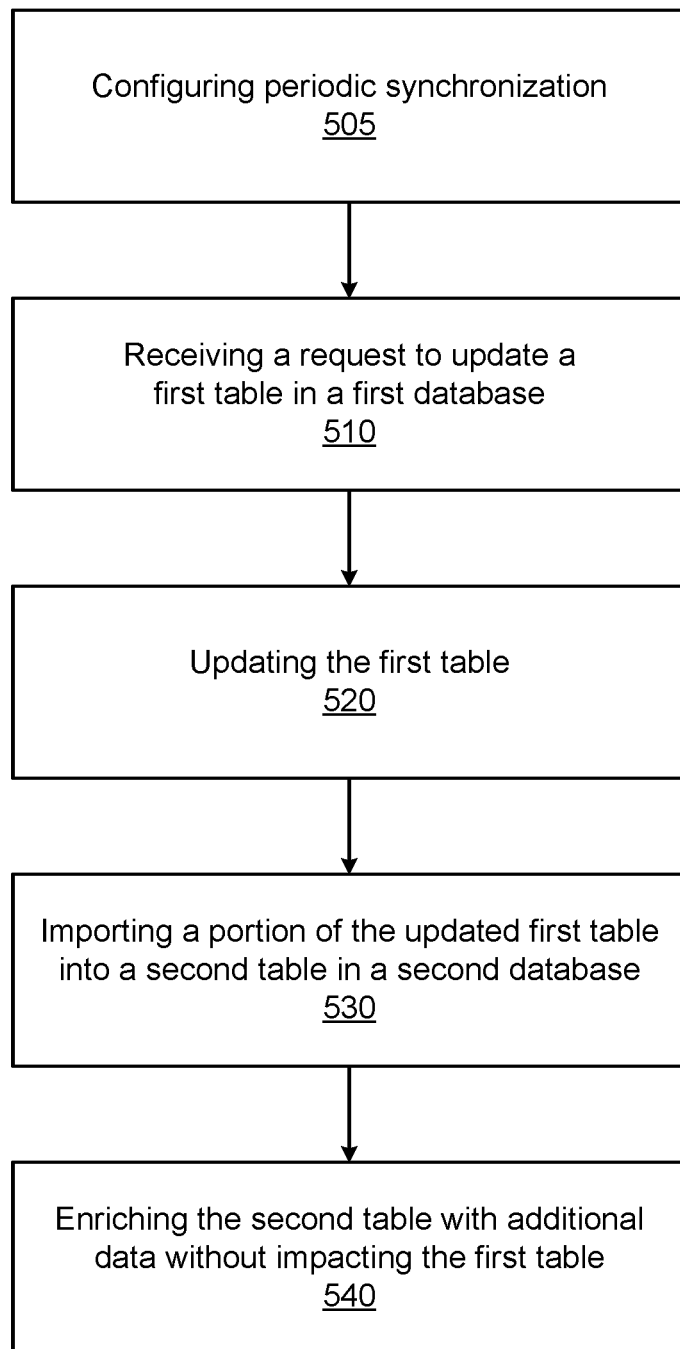
FIG. 5 is a flowchart of a method for partially synchronizing database tables, according to one embodiment.

FIG. 5 illustrates a method 500 for partially synchronizing database tables, according to one embodiment. The steps of FIG. 5 are illustrated from the perspective of the server 110 performing the method 500. However, some or all of the steps may be performed by other entities or components. In addition, some embodiments may perform the steps in parallel, perform the steps in different orders, or perform different steps.

In the embodiment shown in FIG. 5, the method 500 begins with the server 110 configuring 505 a periodic synchronization between a first database and a second database. This may be prompted by the server 110 receiving a request to do so. The server 110 receives 510 a request to update a first table in a first database. The server 110 updates 520 the first table as requested. As part of a synchronization operation (either periodic or manually triggered), the server 110 imports 530 a portion of the updated first table into a corresponding portion of a second table in a second database. Depending upon the embodiment, the portion of the updated first table imported 530 to the second table may include only the subset of data of the updated first table that has changed since a previous synchronization operation, or the portion may include all data designated for synchronization from the first table to the second table. The server 110 also enriches 540 the second table with additional data without impacting the first table. As described previously, the additional data may be imported from another table, entered by a user of the second database, or both.

Figure 6:
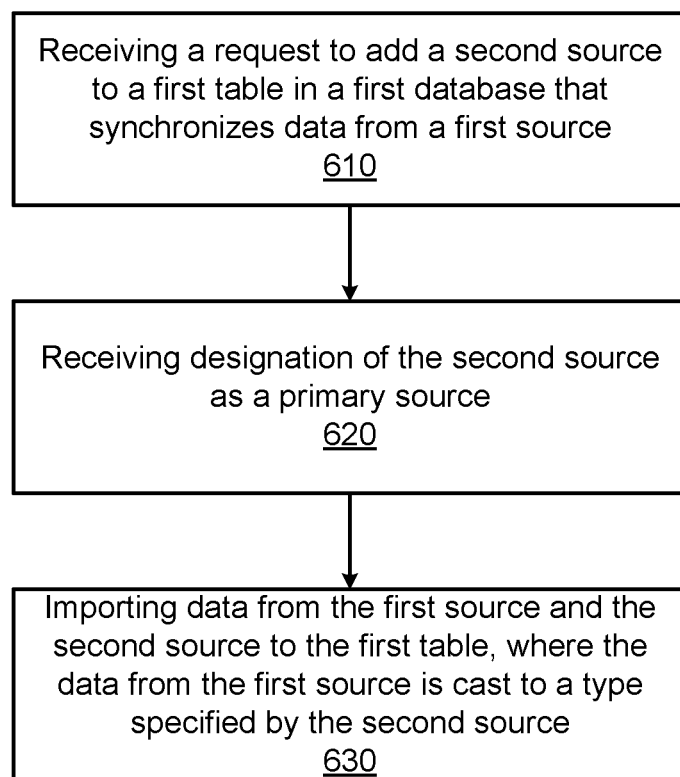
FIG. 6 illustrates a method for multisource synchronizing database tables, according to one embodiment.

FIG. 6 illustrates a method 600 for multisource synchronizing database tables, according to one embodiment. The steps of FIG. 6 are illustrated from the perspective of the server 110 performing the method 600. However, some or all of the steps may be performed by other entities or components. In addition, some embodiments may perform the steps in parallel, perform the steps in different orders, or perform different steps.

In the embodiment shown in FIG. 6, the method 600 begins with the server 110 receiving 610 a request to add a second source to a first table in a first database that synchronizes data from a first source. The server 110 receives 620 a designation of the second source as a primary source. As such, data from the first source that is synchronized to portions of the first table where data from the second source also syncs will be cast to the data type of the data received from the second source for that portion and configured according to a field configuration of the data received from the second source for that portion. The server 110 imports 630 data from the first source and the second source to the first table, where data from the first source is cast to the type specified by the second source.

Computing System Architecture

Figure 7:
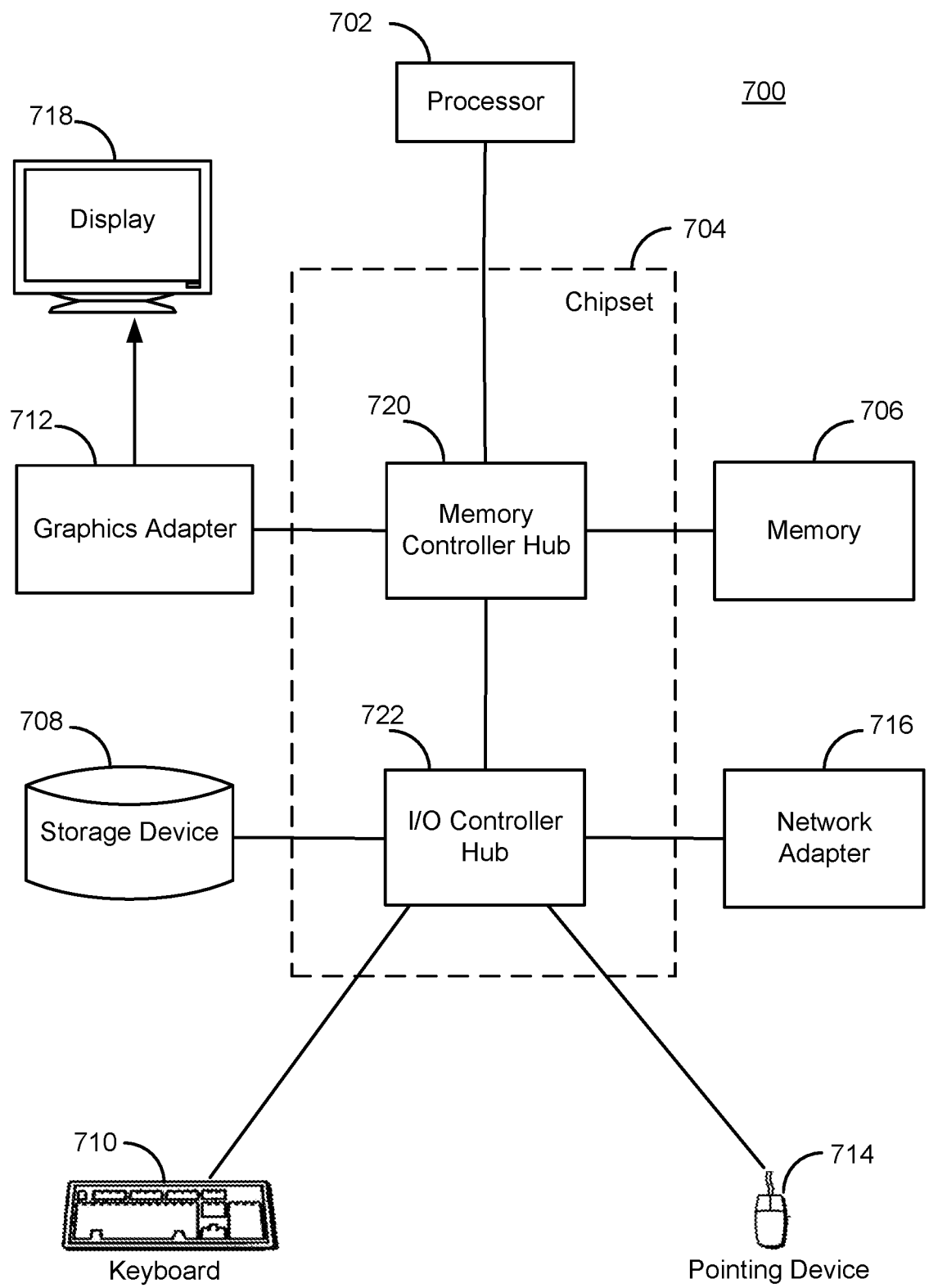
FIG. 7 is a block diagram illustrating an example of a computer suitable for use in the networked computing environment of FIG. 1, according to one embodiment.

FIG. 7 is a block diagram illustrating an example computer 700 suitable for use as the server 110 or a client device 140. The example computer 700 includes at least one processor 702 coupled to a chipset 704. The chipset 704 includes a memory controller hub 720 and an input/output (I/O) controller hub 722. A memory 706 and a graphics adapter 712 are coupled to the memory controller hub 720, and a display 718 is coupled to the graphics adapter 712. A storage device 708, keyboard 710, pointing device 714, and network adapter 716 are coupled to the I/O controller hub 722. Other embodiments of the computer 700 have different architectures.

In the embodiment shown in FIG. 7, the storage device 708 is a non-transitory computer-readable storage medium such as a hard drive, compact disk read-only memory (CD-ROM), DVD, or a solid-state memory device. The memory 706 holds instructions and data used by the processor 702. The pointing device 714 is a mouse, track ball, touchscreen, or other type of pointing device, and is used in combination with the keyboard 710 (which may be an on-screen keyboard) to input data into the computer system 700. The graphics adapter 712 displays images and other information on the display 718. The network adapter 716 couples the computer system 700 to one or more computer networks.

The types of computers used by the entities of FIGS. 1 through 4 can vary depending upon the embodiment and the processing power required by the entity. For example, the server 110 might include a distributed database system comprising multiple blade servers working together to provide the functionality described. Furthermore, the computers can lack some of the components described above, such as keyboards 710, graphics adapters 712, and displays 718.

Additional Considerations

In various embodiments, aggregated synchronization can also be referred to as multisource synchronization.

Some portions of above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the elements or components are present unless it is obvious that it is meant otherwise.

Where values are described as "approximate" or "substantially" (or their derivatives), such values should be construed as accurate +/−10% unless another meaning is apparent from the context. From example, "approximately ten" should be understood to mean "in a range from nine to eleven."

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for a system and a process for providing partial synchronization of database tables. Thus, while particular embodiments and applications have been illustrated and described, it is to be understood that the described subject matter is not limited to the precise construction and components disclosed. The scope of protection should be limited only by the following claims.

What is claimed is:

1. A computer-implemented method for data synchronization, comprising:
   receiving, by a server, a request to synchronize data from a first database to a third database, the first database including data arranged in rows and columns, wherein the request identifies a first set of data in the first database to synchronize to the third database;
   receiving, by a server, a request to synchronize data from a second database to a third database, the second database including data arranged in rows and columns, wherein the request identifies a second set of data in the second database to synchronize to the third database, the second set of data not included in the first database;
   configuring, by the server, a first periodic extraction of the first set of data from the first database to the third database;
   configuring, by the server, a second periodic extraction of the second set of data from the second database to the third database;
   receiving, by the server, a change to the first set of data in the first database;
   receiving, by the server, a change to the second set of data in the second database; and
   propagating, by the server as part of a next instance of the first periodic extraction, the change to the first set of data in the first database to the third database;
   propagating, by the server as part of a next instance of the second periodic extraction, the change to the second set of data in the second database to the third database;
   wherein the third database includes a synchronized portion and an unsynchronized portion, the synchronized portion including the first set of data from the first database and the second set of data from the second database, and the unsynchronized portion including data not extracted from the first database or the second database.

2. The computer-implemented method of claim 1, further comprising:
   receiving, by the server, a request to synchronize a third set of data from the first database to the second database, wherein the third set of data comprises at least a portion of the second set of data; and
   configuring, by the server, a third periodic extraction of the third set of data from the first database to the second database.

3. The computer-implemented method of claim 1, wherein a period of the first periodic extraction is a length of time ranging from one second to one hour.

4. The computer-implemented method of claim 1, wherein the first database is at an external server, the method further comprising:
   identifying, by the server, the external server;
   fetching, by the server, a tabular data mapping for the external server; and
   synchronizing, by the server, data from the external server using the tabular data mapping.

5. The computer-implemented method of claim 1, further comprising:
   receiving, by the server, from a user associated with the third database, a new set of data to add to the unsynchronized portion of the third database; and adding, by the server, the new set of data to the unsynchronized portion of the third database, wherein the first database or the second database does not include the new set of data.

6. The computer-implemented method of claim 1, further comprising:
   setting, by the server, one of the first database or the second database as a primary source; and
   casting, by the server, a data type of a particular column in the third database that includes data from both the first database and the second database, as a data type of the primary source.

7. The computer-implemented method of claim 6, further comprising:
   casting, by the server, a field configuration of the particular column in the third database as a field configuration of the primary source.

8. The computer-implemented method of claim 1, wherein the first database is access-limited to a first set of users and the third database is access-limited to a second set of users comprising at least one user not in the first set of users.

9. The computer-implemented method of claim 1, wherein configuring, by the server, the first periodic extraction of the first set of data from the first database to the third database, comprises:
   receiving, by the server, a field mapping of fields in the first database to fields in the third database, wherein data in a field of the first database is periodically propagated to a mapped field in the third database.

10. The computer-implemented method of claim 1, wherein configuring, by the server, the first periodic synchronization of the first set of data from the first database to the third database, comprises:
    determining, by the server, a field mapping of fields in the first database to fields in the third database, wherein data in a field of the first database is periodically propagated to a mapped field in the third database.

11. The computer-implemented method of claim 10, wherein determining the field mapping comprises:
    matching, by the server, a name of the field in the first database to a name of the mapped field in the third database.

12. The computer-implemented method of claim 1, further comprising:
    receiving, by the server, a request to end the first periodic extraction of the first database to the third database; and
    terminating, by the server, the first periodic extraction, wherein the third database retains its data as of a most recent instance of the first periodic extraction before the termination of the first periodic extraction.

13. The computer-implemented method of claim 1, wherein the first database further includes a second synchronized portion, the second synchronized portion including a view of the second database that is periodically extracted from the second database.

14. The computer-implemented method of claim 13, wherein the first database is a primary source and the third database is a secondary source, further comprising casting, by the server, data of the view of the secondary source to a data type of the view from the primary source in the synchronized portion.

15. The computer-implemented method of claim 1, further comprising a fourth database including a second synchronized portion, wherein the second synchronized portion includes a view of the third database that includes at least some of the first set of data periodically extracted from the first database.

16. A multisource partially synchronized database system comprising:
    one or more processors and one or more non-transitory computer-readable media storing:
       a first database including data arranged into rows and columns;
       a second database including data arranged into rows and columns; and
       a third database including a synchronized portion and an unsynchronized portion,
    wherein the synchronized portion includes a first view of the first database that is periodically extracted by the one or more processors from the first database and a second view of the second database that is periodically extracted by the one or more processors from the second database,
    wherein the first database is a primary source and the second database is a secondary source, data in the third database synchronized from the secondary source being cast to a data type specified by the primary source, and
    wherein the unsynchronized portion includes data provided by the third set of users.

* * * * *